3 Sheets—Sheet 1.
I. LANCASTER,
Assignor, by mesne assignments, to McCORMICK HARVESTING MACHINE Co.
Grain Binder.
No. 9,640. Reissued April 5, 1881.
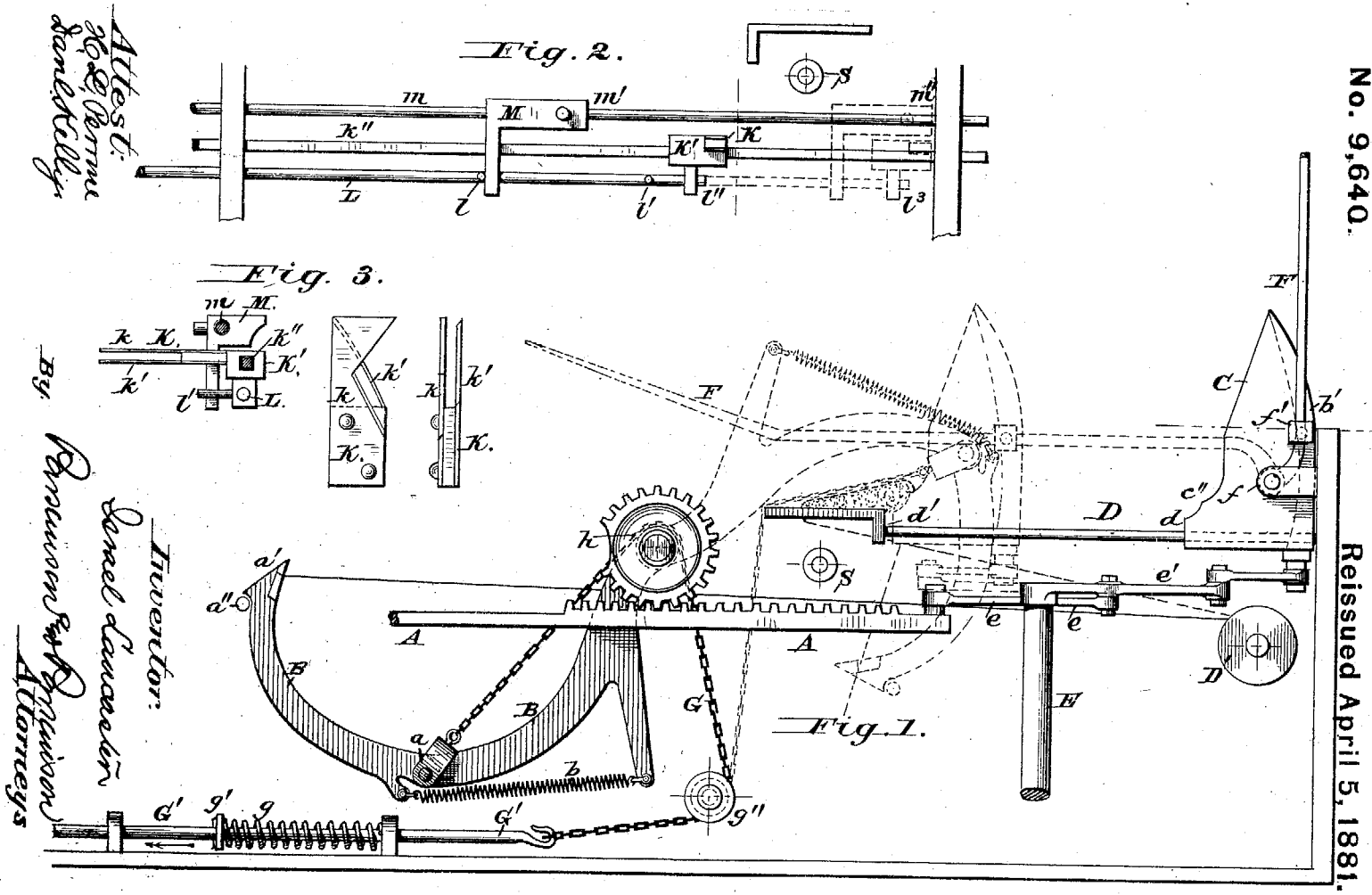
Attest:
H. L. Perrine
Daniel Kelly
Inventor:
Israel Lancaster
By Pennington & Pennington
Attorneys 3 Sheets—Sheet 2.
I. LANCASTER,
Assignor, by mesne assignments, to McCormick Harvesting Machine Co.
Grain Binder.
No. 9,640. Reissued April 5, 1881.
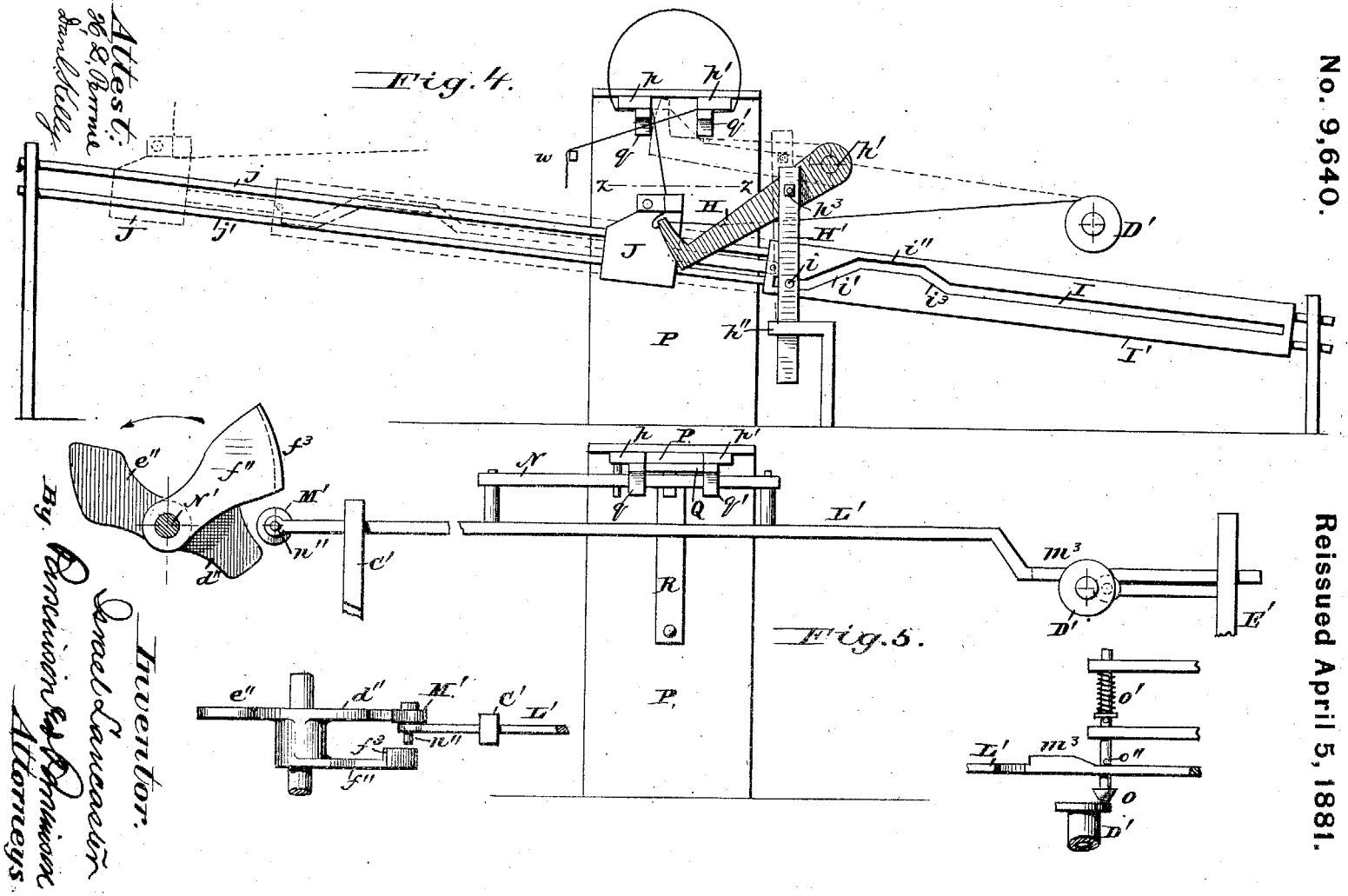

I. LANCASTER,
Assignor, by mesne assignments, to McCormick Harvesting Machine Co.
Grain Binder.
No. 9,640. Reissued April 5, 1881.
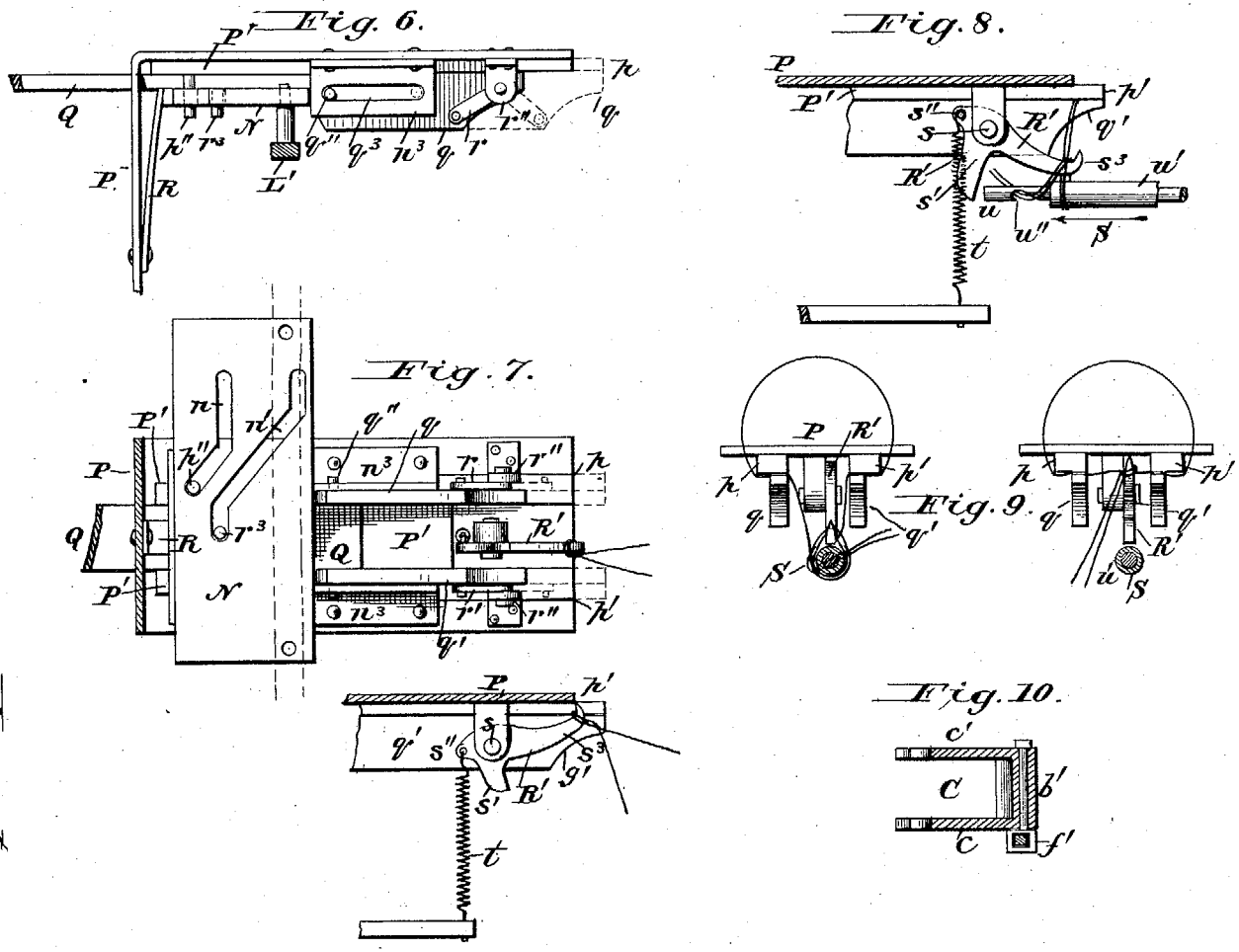
Attest:
H. D. Pennie
Danl. Kelly.
Inventor.
Israel Lancaster
By Pomeroy & Pomeroy
Attorneys

UNITED STATES PATENT OFFICE.

ISRAEL LANCASTER, OF SARASOTA, FLORIDA, ASSIGNOR, BY MESNE ASSIGNMENTS, TO McCORMICK HARVESTING MACHINE COMPANY, OF CHICAGO, ILLINOIS.

GRAIN-BINDER.

SPECIFICATION forming part of Reissued Letters Patent No. 9,640, dated April 5, 1881.

Original No. 71,023, dated November 19, 1867. Application for reissue filed July 17, 1880

*To all whom it may concern:*

Be it known that I, ISRAEL LANCASTER, formerly of Baltimore, in the State of Maryland, but now of Sarasota, in the county of Manatee and State of Florida, have invented certain new and useful Improvements in Machines for Binding Grain, of which the following is a specification.

My invention relates to that class of grain-binders which act automatically by connection with the reaper; and it consists in improvements in the band-carrying, gavel-compressing, and cord-clamping devices; in the provision of an arm for adjusting the loop upon the ends of the cord beneath the clamp, taking up slack, and tightening the knot, and in various combinations and details hereinafter pointed out.

In the drawings, Figure 1 is a front elevation, showing the operation of the binder-arm and compressor and their accessories. Fig. 2 is an elevation parallel to Fig. 1, and seen from the opposite side, to explain the operation of the knife or cord-cutter; Fig. 3, details of the cutter-head and cutter; Fig. 4, a front elevation of the cord-placing arm and the parts by which it is operated; Fig. 5, a front elevation and partial plan view, showing the construction and operation of the irregular cam and the bar which operates the pinching device or cord-clamp, and which regulates the friction on the spool from which the band material is drawn; Fig. 6, a side elevation of the cord-clamp, seen at right angles to the preceding figure; Fig. 7, a bottom-plan view of the same; Fig. 8, side elevation of the device for adjusting and tightening the knot in the sheaf-band; Fig. 9, end elevations of the same; Fig. 10, a horizontal section of the compressor.

The machine, in its general features, resembles others heretofore invented by me and forming the subject-matter of Letters Patent granted to me January 23, 1866, and numbered 52,175, and April 24, 1866, numbered 54,177. An examination of these patents, in connection with the following description, will give an intelligent understanding of my present improvements and of their order of operation. They will show the position of the platform of the binder in relation to its working parts. They will show the method of actuating the band-carrier or binding-arm by means of a reciprocating bar driven from the cam-shaft. They will show the operation of the sliding block which closes the fore part of the binder-arm and actuates the knot-tying device. They will show the construction and operation of the cord-carrying block and of the jaw holding the band material, which jaw forms part of this block. They also show the construction and operation of the cam-shaft, identical with the shaft in Fig. 5, which gives the initial movements to the entire binder. They also show the construction and operation of the knot-tying devices. These different parts form no part of the present invention, but are referred to for the purpose of explanation.

A is the reciprocating bar which drives the vibrating binder-arm or band-carrier B. This is composed of two parts, held open by a spring, *b*, and its office is to place the band around the sheaf.

C is a sliding wing or compressor, between which and the binder-arm the grain is gathered and compacted. It is constructed with two side pieces, *c c'*, and a back, *b'*, so as to form a passage-way for the binder-arm continuous with the slot in the table and keep the grain from contact with the end of the cord. The back piece, *b'*, of the compressor is slightly curved, and acts as a guide to the fore part of the binder-arm. The side pieces are formed with shoulders *c''* near their base, but somewhat above the plane of the grain-table, which abut against the matted grain and check it from slipping under the action of the band material as the binder-arm swings the latter through the slot in the table and against the grain in its movement. The compressor slides on the guide-bar D from *d* to *d'* and back, gathering and bunching the grain before it in its forward stroke.

The cord for binding is carried by a spool, D', from which it is conducted to the jaw *a'* at the end of the binder-arm, being delivered thereto by means of a traveling cord-holding block such as described in my Patent No. 54,177, above mentioned.

If the band-carrier or binder-arm were allowed to complete its movement from the position shown in full lines to that shown in broken lines before the fore part, B′, begins to close upon the joint *a*, the band would be in danger of breaking, owing to the tension on the spool and the friction of the cord against the gavel. The length of cord, reaching from the spool to the jaw *a′* of the binder-arm, is sufficient to pass around the largest sheaf which can be contained within the embrace of the arm, the compressing-wing, and the binding-platform when the arm has completed its movement and the compressor is closed against it—that is, when the gavel is compressed. When the sheaf is large and the binder-arm has made half its movement there is, unless its end closes in as it moves, no longer cord enough to reach around the gavel in its expanded condition, except the cord itself is of sufficient strength to act as a compressor and form its bed. Even when it is of considerable strength, from the presence of weeds in the straw or other causes such resistance is offered that this is practically impossible, and therefore it is always liable to break. I obviate this objection by operating the jointed binder-arm and the sliding compressor simultaneously, so that as the jaw *a′* of the binder-arm is at that point in its passage around the sheaf where the resistance begins to endanger the safety of the band the part *a″* of the nose of the arm strikes the curved guideway afforded by the back piece of the compressor and closes the hinged fore part, B′, gradually upon its pivot as it passes to the end of its stroke. Thus the end of the band approaches the sheaf as it is carried around, the operation being similar to the winding of a cord upon a cylinder, and all danger of breakage is removed. This simultaneous movement of the binder-arm and compressor is effected in any convenient manner, as by attaching the compressor to the reciprocating bar which actuates the arm or by connecting it with an arm fastened to the binder-arm shaft. I have shown it as indirectly connected with and operated by the reciprocating bar through the instrumentality of links *e e′* and an intermediate cranked rock-shaft, E.

Loose or tangled grain is apt to project above the arc described by the point of the binder-arm and to be pierced by the arm, so as to make a slovenly and misshapen sheaf. To prevent this I pivot the bar F to a bracket, *f*, from the frame and pass it through a guide, *f′*, on the side of the compressor. This guide works on a pivot, so as to accommodate itself to the changing positions of the arm. When the compressor is at the rear limit of its stroke the guide which it carries is above the pivot of the arm, so that the latter is in a vertical position; but when the compressor moves forward the arm is swung on its pivot and brought down to a horizontal position by the action of the guide, thus compressing the grain within the arc described by the binder-arm and close to the path of the latter.

Attached to the binder-arm, at or near the joint *a*, is a chain, G, secured at the other end to a sliding rod, G′, upon which is placed a coiled spring, *g*. One end of this spring rests against a fixed stop, which may be one of the bearings by which the rod is guided, and the other presses against a collar or washer, *g′*, upon the rod, so that the rod is always thrust away from the chain and keeps the latter strained. The chain is brought into line with the rod by being passed over a suitable guide-pulley, *g″*, and is then carried up to its point of attachment to the binder-arm. When the binder-arm is down in its position of rest the chain is bent over and bears upon the end of its shaft, as at *h*. In this position the tension on the spring *g* is regulated to nearly balance the weight of the binder-arm, so that the chain may assist in lifting it from and returning it to its quiescent position, overcoming the inertia in one case and opposing the momentum in the other. When the binder-arm moves to encircle a gavel the chain is carried up and into contact with the straw, forming a self-adjusting and elastically-yielding compressor therefor, so as to compensate for sheaves of different sizes.

H is the cord-placing lever, pivoted at *h′* to a bracket or support. The other end is angular, and provided with an eye, through which passes the cord from the spool. A bar, H′, passing through the guide *h″* on the framework, is pivoted to the lever at $h^3$, and by means of a pin, *i*, which takes into the cam-slot I in the plate I′, is moved up and down so as to actuate the lever. The plate I′ is fastened to the cord-carrying block J at one end, and slides back and forth on the guide-rods *j j′*, as shown in full and broken lines. While the pin *i* remains in the long straight portion of the slot the cord-placing lever occupies a position intermediate between its two extremes of stroke to properly guide the cord drawn from the spool. As the plate moves from the right to the left the pin reaches and is caused to ascend the incline *i′*, raising the bar H′ and swinging the lever up to place the cord against the upper jaw of the cord-clamp, in position to be grasped by the closing of the lower jaw, which now takes place. Next the pin enters the straight portion *i″* of the slot, and the bar and lever are held stationary for a brief interval. Then it descends the incline $i^3$ and swings the lever down to place the cord so that it may be grasped by the jaws of the cord-carrying block, which meet it, as shown, on the side away from the spool.

The knife K is formed of two cutting-blades riveted together at their shanks upon a piece one-eighth of an inch thick. The cutting-edge of one of these blades, *k*, is V-shaped, that of the other, *k′*, straight and in the direction of a diagonal across the width of the blade. The knife is mounted upon a block or head, K′, projecting its cutting end sidewise therefrom. A guide-bar, *k″*, rectangular in cross-section, passes through supports and affords a way for this block, and by its shape steadies it and prevents it from turning. From the lower side of the block depends a stud, to which is fastened one end of the rod L. The other end passes through a guiding-support. Two pins, $l\ l'$, are fastened to the side of this rod and project laterally therefrom. The block is reciprocated upon its way $k''$ from the point $l''$ to the point $l^3$, moving the knife on the dotted line $z\ z$, Fig. 4, across the stretched cord depending from the cord-clamp beneath the sheaf, through that line to the jaws of the cord-carrying block, and severing it. This motion of the cutter-head is given by an arm pendent from the reciprocating block M, which rides upon the guide-rod $m$ from the point $m'$ to the point $m''$, and in its passage to and fro completes the closing of the hinged forearm of the band-carrier and operates the knot-tying device, as described in one of the former patents above referred to.

The pendent arm of this block moves parallel with and in close proximity to the rod L, between the pins $l\ l'$, so that whenever it comes in contact with either of the pins the rod and cutter-head are moved with it to the limit of its motion in that direction; but while it is traveling from one pin to the other they are left at rest.

The action of the knife is peculiar. The cord strikes the diagonal edge of the blade $k'$ near the shoulder which it forms with the shank. It slips down this edge and may reach the reverse edge of the V-shaped blade before being severed, but will be certainly divided by the combined action of the two blades at this point. Without the intervention of the second blade it might, in case the edge of the diagonal blade had become dulled, slip entirely past it and over the end uncut.

The bar L′, Fig. 5, actuates the pinching-bars or cord-clamp and regulates the tension on the spool which contains the binding material. It has an anti-friction roller, M′, attached at one end, and near the other an inclined projection or cam, $m^3$. It is held to its proper position by guiding-supports C′ E′, through which it reciprocates. Near the center of the bar is fastened the plate N, containing two cam-slots, $n\ n'$, through its thickness. The bar L′ has three motions: the first to the right a short distance; the second to the right a greater distance; the third to the left over a space equal to the sum of the first two distances, and so continuing. These movements are given by the irregular cams $d''\ e''\ f''$ on the cam-shaft N′, which, with the cams upon it, has two movements, one continuous upon its axis and the other a longitudinal reciprocation. The cams $d''\ e''$ are plates situated in the same plane. The cam $f''$ is in a parallel plane a short distance from the other, and consists of an overhanging projection or ledge, $f^3$, facing the other cam-plates. As the cam-shaft revolves in the direction of the arrow the cam $d''$ strikes the roller M′ and gives the bar its first movement to the right. The cam $e''$ next strikes the roller and gives the bar its second movement to the right. The cam-shaft is now moved endwise, which brings the cam-ledge $f^3$ into line to gear with the pin $n''$ on the end of the bar, giving the bar its third and final movement to the left.

Against the head of the spool D′, which contains the binding material, a friction-block, $o$, is held by means of the coiled spring $o'$ upon a rod fastened thereto. This rod passes through and is guided by brackets from the framework, one of which affords a seat for the spring, and it has a laterally-projecting pin, $o''$, which rests upon the rod L′, in advance of the cam projection or incline $m^3$. At the second movement of the bar, which takes place directly after the binder-arm has carried the cord around the gavel, the incline passes under the pin $o''$ and withdraws the friction-block from the head of the spool, so that the latter may readily revolve and yield the cord without danger of breakage, when it is suddenly drawn therefrom by the rapid movement of the cord-placing lever H.

P is the metallic frame which sustains the different parts of the cord-clamping device.

P′ is a plate having two parallel arms or fingers, $p\ p'$, which form the upper jaws of the two sets of pinching-bars or clamps. A pin, $p''$, from this plate takes into the cam-slot $n$ in the plate N.

A sliding bar, Q, passing at one end through the frame P and formed at the other end with a head, has pivoted to it, against each side of the enlarged end, the plates $q\ q'$, which form the under jaws of the cord-clamps. The pin $q''$, upon which these are pivoted, passes through one end of each and through the head of the bar Q and projects into the slots $q^3$ in the angular plates on brackets $n^3$, secured to the supporting-frame, so that it may support the forward end of the bar and the rear end of the plates.

Links $r\ r'$, pivoted at one end to brackets or hangers $r''$ from the frame and at the other to the plates $q\ q'$, support the advanced ends of the latter and determine their downward, forward, and upward movement, to seize and clamp the cord as they are projected.

A pin, $r^3$, upon the bar Q enters the cam-slot $n'$ in the plate N, to control the movement of the bar.

A stiff spring, R, bears against the plate and tends to thrust it constantly forward in order to keep a steady pressure upon the band when the jaws have grasped it, and also to compensate for any wear of parts.

In the first movement of the cam-plate with the bar L′ in the direction of the arrow, the pin $p''$ passes along the inclined portion of the slot $n$ and throws out the plate P′, carrying its fingers $p\ p'$ to the position shown by broken lines. Meanwhile the pin $r^3$ travels in the straight portion of its cam-slot $n'$ and the bar Q remains at rest. The sheaf-band is now brought against the finger or jaw $p'$ by the arrival of the end of the binder-arm at the point $w$, Fig. 4, and against the finger or jaw $p$ by the action of the cord-placing arm. Then the second movement of the cam-plate takes place, carrying the pin $r^3$ down the incline in the slot $n'$ and throwing out the bar Q, with the lower jaws, to clamp the ends of the band, the upper jaws being, in turn, held fixed by the straight portion of their cam-slot. After this the slots for a short distance become parallel, to hold the jaws upon the cord while the knot-tying device is in action. At the third or left-hand movement of the cam-plate both the upper and lower jaws are withdrawn and the band is released.

The device for adjusting and tightening the knot consists in a plate, R′, pivoted at $s$ to the frame P, and formed with a foot-piece, $s'$, a heel portion, $s''$, and a downwardly-projecting finger, $s^3$, against which the shaft of the knotter acts. The plate is held in its position by a coiled spring, $t$, attached to the heel portion $s''$, which tends to keep the finger $s^3$ up immediately beneath the surface of the grain-table and between the cord-clamps. When the shaft $u$ of the knotter S is driven in the direction of the arrow against the foot-piece the finger is brought down until it touches the tube $u'$, around which the loop is formed, so that in the process of tying the knot in the ends of the cord the loop may be thrown around both the tube and the finger, as if they were one piece. When the shaft $u$ is withdrawn into the tube, carrying with it by means of its hook $u''$ the bight of the cord, and the tube itself recedes, the finger is thrown up by the action of the coiled spring, carrying with it the loop, and running this along and gradually tightening it upon the strands which are not yet entirely disengaged from the knotter to and at a point immediately between the cord-clamps, so as to take up the slack beneath that point. When the sheaf is released by the opening of the cord-clamps the expansion of the straw draws the knot off of the finger.

I claim as my invention—

1. In combination with a binder-arm, an opposing compressing-frame ribbed vertically to admit the point of the binder-arm and raise the grain from contact with the band.

2. In combination with a binder-arm, an opposing compressing-frame ribbed vertically to admit the point of the binder-arm and raise the grain from contact with the band, and a slotted grain-table, through which the point of the binder-arm carries the band to the uniting mechanism beneath after traversing said frame.

3. In combination with a binder-arm, an opposing compressing-frame ribbed vertically to admit the point of the binder-arm, and having near its base, above the plane of the grain-table, shoulders or abutments to check the gavel from slipping under the pressure of the band material.

4. In combination with a jointed binder-arm, an opposing vertical compressing-frame having a guide for the hinged fore part of the arm, and a slotted grain-table, through which the point of the arm is directed.

5. In combination with a binder-arm, a reciprocating compressor which advances to meet the arm and compress the gavel conjointly therewith.

6. In combination with a jointed binder-arm, a reciprocating compressor which advances to meet the arm and acts to gradually close its fore part.

7. The combination, with the binder-arm and coacting compressor, of a supplementary movable arm or finger which closes in past their point of meeting, and close thereto, to gather loose or tangled grain into their compass.

8. The combination of the vibrating binder-arm, the reciprocating compressor, and the supplemental arm or guard pivoted to the frame and passing through a guide upon the compressor, whereby it is operated by the reciprocation of the latter.

9. In combination with the band-receiving mechanism, two cord-clamps, by which the band is held and between which its ends are united.

10. In combination with the cord-clamps and the cord-holder, a cord-placing lever having an eye at the end, through which the cord is drawn, and vibrating alternately between the clamps and the holder to place the cord.

11. In combination with the cord-clamps and the cord-holder, a cord-placing lever having an eye at the end, through which the cord is drawn, and mechanism actuating the lever in the manner described, to take successively the positions for guiding the cord as it runs from the spool, for placing it in the clamps, and for delivering it to the holder.

12. In combination with the cord-placing lever H and with the spool, a tension device acting upon the spool and mechanism whereby the tension is automatically released during the movement of said lever.

13. In combination with the cord-clamps and with the cord-placing lever, a cord-spool, a tension device acting upon said spool, and mechanism whereby said tension is automatically released during the movement of the lever.

14. In combination with the knotter and with the cord-clamp, a vibrating finger over the end of which the loop is thrown and by which it is run up the cord and tightened close to the clamp.

15. The combination, with the vibrating band-carrier or binder-arm, of the wing or compressor reciprocating along the grain-table to meet and coact with said binder-arm, as described, and for the purpose mentioned.

16. The combination, with the band-carrier or binder-arm, of the chain, its dowel-rod, and spring to form an elastic and flexible compressing device, substantially as described.

17. The combination, with the band-carrier or binder-arm, of the flexible spring-compressor, arranged, substantially as described, to act as a buffer in the reverse throw of the arm.

18. In combination with the positively-actuated clamps for holding the ends of the band between the gavel and the knotting or tying mechanism, a spring acting to press them steadily upon the band after they have grasped it.

19. In combination with the clamps and the cam-plate by which they are actuated, the spring R, bearing upon said cam-plate to press the clamping-jaws upon the band after they have grasped it.

20. In combination with the clamping-jaws, the recipocating plate N, formed with two cam-slots, one of which acts upon the upper clamping-jaws as the plate advances to project them for the reception of the band, and the other upon the lower jaws to close them upon the band so received, substantially as described.

21. In combination with the cord-placing lever, an actuating-plate having a cam-slot substantially such as described, whereby the lever is caused to take its successive positions.

22. In combination with the reciprocating bar L′, the cam-segments on the shaft N′, formed, arranged, and relatively proportioned, substantially as described, whereby the bar is given the three movements set forth.

23. The knife constructed with two parallel blades, the one having a re-entrant edge and the other an oblique straight edge, substantially as described.

24. In combination with the cord knotting and holding devices, the knife K, mounted upon the reciprocating block K′, and formed with two blades, *k k′*, the first having a convergent edge and the second an oblique straight edge, as and for the purpose set forth.

25. In combination with the two cord-clamps, receiving each one end of the sheaf-band, and with the knotter operating below them, the finger over which the loop is thrown in the knotting operation, and whereby it is run up the strands of the cord to a line between said clamps, substantially as described.

ISRAEL LANCASTER.

Witnesses:
WALTER R. YATES,
D. G. RANEY, Jr.